(12) United States Patent
Rakshit

(10) Patent No.: US 8,902,252 B2
(45) Date of Patent: Dec. 2, 2014

(54) DIGITAL IMAGE SELECTION IN A SURFACE COMPUTING DEVICE

(75) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 13/238,073

(22) Filed: Sep. 21, 2011

(65) Prior Publication Data

US 2013/0069983 A1    Mar. 21, 2013

(51) Int. Cl.
*G09G 5/00*    (2006.01)
*G06F 17/30*    (2006.01)

(52) U.S. Cl.
CPC .................. *G06F 17/30268* (2013.01)
USPC ........................................... 345/629

(58) Field of Classification Search
None
See application file for complete search history.

(56) References Cited

U.S. PATENT DOCUMENTS

| | | | |
|---|---|---|---|
| 7,394,947 B2 | 7/2008 | Li et al. | |
| 7,756,334 B2 | 7/2010 | Kim et al. | |
| 2008/0086496 A1 | 4/2008 | Kumar et al. | |
| 2008/0282198 A1* | 11/2008 | Brooks et al. | 715/854 |
| 2009/0046898 A1 | 2/2009 | Li et al. | |
| 2010/0205190 A1 | 8/2010 | Morris et al. | |

OTHER PUBLICATIONS

Szomszor et al. "Correlating User Profiles from Multiple Folksonomies", HT'08 Jun. 19-21, 2008.*
Blogging PRWeb "Making Infographic Work for Small Business", http://www.bloggingprweb.com/making-infographics-work-for-small-business, posted Jan. 14, 2011.*
"ALIPR Automatic Photo Tagging and Visual Image Search" (Retrieved on Apr. 20, 2011). Retrieved from the Internet: <URL: http://alipr.com>.
"Automatic image annotation", Wikipedia (Retrieved on Apr. 20, 2011). Retrieved from the Internet: <URL: http://en.wikipedia.org/wiki/Automatic image annotation>.
"Automatic image tagging gets smarter", Tech Radar UK (Retrieved on Apr. 20, 2011) Retrieved from the Internet: <URL: http://www.techradar.com/news/automatic-image-tagging-gets-smarter-474886>.
Ya-Xi Chen et al., "TagClusters:Semantic Aggregation of Collaborative Tags beyond Tag Clouds", Smart Graphics, Lecture Notes in Computer Science, 2009. Retrieved from the Internet: <<URL: http://www.springerlink.com>>.
Madirakshi Das, "Automatic Face-based Image Grouping for Albuming", Retrieved from the Internet: < URL: http://ieeexplore.ieee.org/xpl/freeabs_all.jsp?arnumber=1244468>.

(Continued)

*Primary Examiner* — Xiao Wu
*Assistant Examiner* — Yingchun He
(74) *Attorney, Agent, or Firm* — Law Offices of Ira D. Blecker, P.C.

(57) ABSTRACT

A method of image selection in a surface computing device which includes: responsive to placing a device containing a plurality of images in proximity to a surface computing device, transferring the plurality of images to the surface computing device; creating tags from attributes of the plurality of images and grouping the tags together to form a tag cloud; responsive to selecting one tag as a primary tag, identifying tags related to the primary tag; displaying the primary tag and related tags as a series of geometric shapes in a primary tag diagram with each of the primary tag and related tags being represented by a geometric shape such that at least one geometric shape representing one of the related tags overlaps the geometric shape representing the primary tag to form an area of intersection representing an image; responsive to selecting the area of intersection, displaying the image.

14 Claims, 5 Drawing Sheets

(56) References Cited

OTHER PUBLICATIONS

Rangachar Kasturi, "Information Extraction from Images of Paper-Based Maps", IEEE Transactions on Software Engineering, vol. 14, No. 5, May 1988, pp. 671-675.

Ivan Ivanov et al., "Object-based Tag Propagation for Semi-Automatic Annotation of Images", ACM MIR '10, Mar. 29-31, 2011, pp. 497-505.

Xirong Li et al., "Combining Multi-Feature Tag Relevance Learning for Social Image Retrieval", Proceedings ASCI Conference 2010.

"Microsoft 'Surface'—The Possibilities" (Retrieved Apr. 28, 2011). Retrieved from the Internet: <URL: http://www.youtube.com/watch?v=6VfpVYYQzHs>.

"Wolfram Demonstrations Project:Grouping Images by Color" (Retrieved on Apr. 20, 2011), Retrieved from the Internet: <URL: http://demonstrations.wolfram.com/GroupingImagesByColor/>.

Haisong Gu et al., "Information extraction from image sequences of real-world facial expressions", Retrieved from the Internet: URL: http://www.springerlink.com/content/vjncx2ubf35lkneg/>.

"The Humanities Meet Information Visualization", (Retrieved on Apr. 20, 2011) Retrieved from the Internet: <URL: http://mininghumanities.com/2010/06/01/the-humanities-meet-information-visualization/>.

* cited by examiner

DIGITAL IMAGE SELECTION IN A SURFACE COMPUTING DEVICE

BACKGROUND

The exemplary embodiments relate to digital image selection and, more particularly, relate to a method of selecting digital images from a plurality of digital images presented to a user in a surface computing device.

In surface computing, the associated displays are generally touch-sensitive screens of substantially any form factor that often forego many traditional I/O (input/output) devices such as a keyboard or mouse in favor of tactile-based manipulation. In order to compensate for this transition, computing surfaces may be implemented as multi-touch surfaces. Microsoft was an early proponent of surface computing which was based entirely on a multi-touch interface in a coffee-table like design.

Digital images from a wireless-enabled (such as Bluetooth) mobile device such as a digital camera or mobile phone may be downloaded to a surface computer by merely placing the mobile device on the surface computer. The digital images will appear on the screen of the surface computer adjacent to the mobile device. If the number of digital images stored is small, there is no problem in viewing all of the digital images at the same time. However, if the number of digital images stored is large, then it will be difficult for a user to find a desired digital image from the large number of digital images displayed.

BRIEF SUMMARY

The various advantages and purposes of the exemplary embodiments as described above and hereafter are achieved by providing, according to a first aspect of the exemplary embodiments, a method of image selection in a surface computing device which includes: responsive to placing a device containing a plurality of digital images in proximity to a surface computing device, transferring the plurality of images to the surface computing device; creating tags from attributes of the plurality of images and grouping the tags together to form a tag cloud; responsive to selecting one tag as a primary tag, identifying tags related to the primary tag; displaying the primary tag and related tags as a series of geometric shapes in a primary tag diagram with each of the primary tag and related tags being represented by a geometric shape such that at least one geometric shape representing one of the related tags overlaps the geometric shape representing the primary tag to form an area of intersection representing at least one image; and responsive to selecting the area of intersection, displaying the at least one image.

According to a second aspect of the exemplary embodiments, there is provided a method of image selection in a surface computing device having a plurality of digital images which includes: creating tags from attributes of the plurality of images and grouping the tags together to form a tag cloud; responsive to selecting one tag as a primary tag, identifying tags related to the primary tag; displaying the primary tag and related tags as a series of geometric shapes in a primary tag diagram with each of the primary tag and related tags being represented by a geometric shape such that at least one geometric shape representing one of the related tags overlaps the geometric shape representing the primary tag to form an area of intersection representing at least one image; and responsive to selecting the area of intersection, displaying the at least one image.

According to a third aspect of the exemplary embodiments, there is provided a computer program product for image selection in a surface computing device, the computer program product including: a computer readable storage medium having computer readable code embodied therewith, the computer readable program code including: responsive to placing a device containing a plurality of digital images in proximity to a surface computing device, computer readable program code configured to transfer the plurality of images to the surface computing device; computer readable program code configured to create tags from attributes of the plurality of images and grouping the tags together to form a tag cloud; computer readable program code configured to display the tag cloud; responsive to selecting one tag as a primary tag, computer readable program code configured to identify tags related to the primary tag; computer readable program code configured to display the primary tag and related tags as a series of geometric shapes in a primary tag diagram with each of the primary tag and related tags being represented by a geometric shape such that at least one geometric shape representing one of the related tags overlaps the geometric shape representing the primary tag to form an area of intersection representing at least one image; and responsive to selecting the area of intersection, computer readable program code configured to display the at least one image.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

The exemplary embodiments relate to a method of selecting certain images from a group of images that may be displayed on a surface computer.

Figure 1:
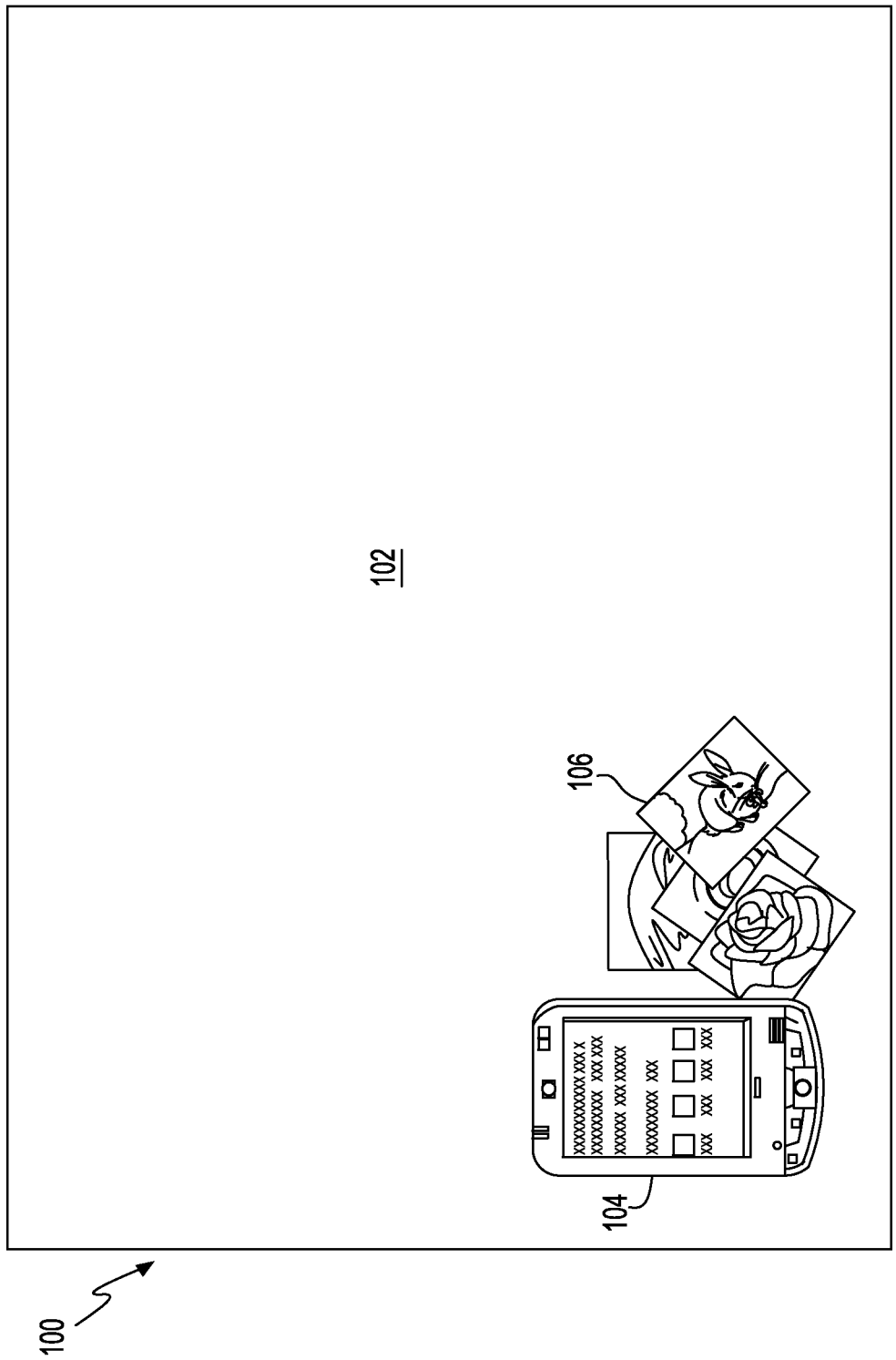
FIG. 1 is a plan view of a surface computer with a smart phone placed on the surface computer and digital images conventionally transferred from the smart phone to the surface computer.

Referring to the Figures in more detail, and particularly referring to FIG. 1, there is shown a surface computer 100, such as a Microsoft Surface Computer, having a touch screen 102. When a mobile device 104, such as a mobile phone or digital camera, is placed in contact with the touch screen 102, the surface computer 100 senses the mobile device 104 and if the mobile device 104 is wireless-enabled, such as by Bluetooth, the surface computer 100 may download and transfer digital images 106 from the mobile device 104 to the touch screen 102.

In an alternative embodiment, the mobile device 104 may be replaced by a computing device such as a laptop, personal computer or even a server provided it has wireless capability such as Bluetooth to transfer the digital images 106 to the touch screen 102. In this case, the computing device may be placed in proximity to the touch screen 102 so that the wireless capability of the computing device is able to transfer the digital images 106 to the touch screen 102.

A user may then manipulate the digital images 106 by touching the touch screen 102. Such manipulation may include, for example, moving the digital images 106 around, enlarging the digital images 106, rotating the digital images 106 and deleting certain of the digital images 106.

It may be that the user may be interested in only 1 or 2 digital images that are displayed on the touch screen 102. If only a few digital images 106 are transferred from the mobile device 104 to the touch screen 102, the task of finding the desired digital image or images is not difficult.

However, if there are a large number of digital images that have been transferred to the touch screen 102, it may be difficult for a user to find the exact digital image or images that the user is interested in.

Figure 2:
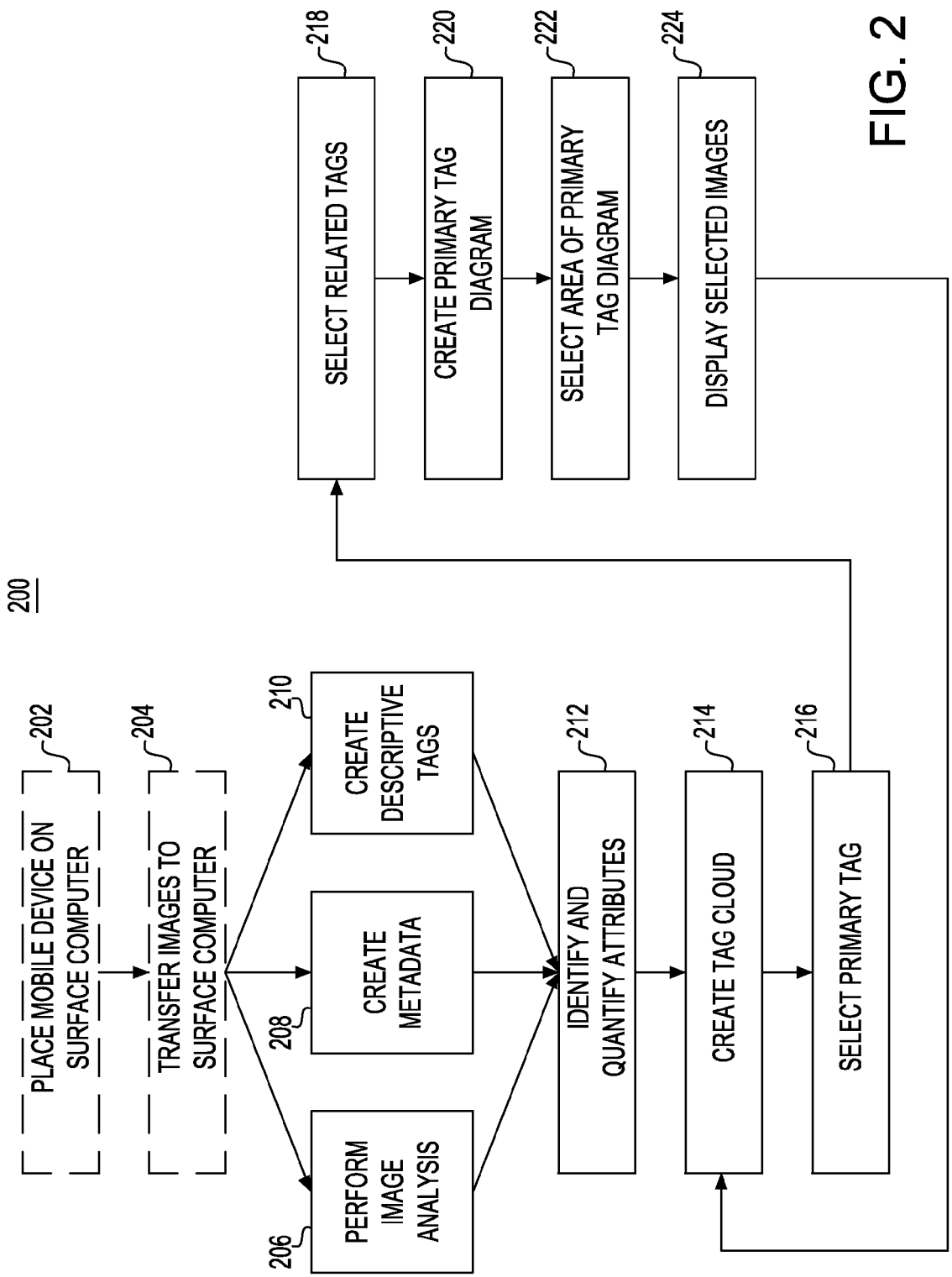
FIG. 2 is a flow chart of a method according to the exemplary embodiments.

Referring now to FIG. 2, there is illustrated a method 200 of image selection according to the exemplary embodiments. The method 200 begins by placing a mobile device, such as a wireless-enabled mobile phone, smartphone or digital camera, on a surface computer, block 202, and then transferring the digital images to the surface computer, block 204 as described with respect to FIG. 1. Again, the wireless-enable mobile phone, smartphone or digital camera may be replaced with a computing device having wireless capability as discussed above.

In an alternative exemplary embodiment, it may not be necessary to place the mobile device on the surface computer and transfer the digital images to the surface computer if the digital images have been previously downloaded to the surface computer by other means or at a previous time.

The digital images may then be "tagged" according to the exemplary embodiments. The process of tagging may include performing image analysis, block 206, creating metadata, block 208, and creating descriptive tags, block 210. Performing image analysis may include imaging the shape of objects, facial features and the like. Creating metadata may include data about an object or person such as global positioning coordinates, data, time, image settings and the like. Creating descriptive tags may include automatically or manually adding descriptive tags about the digital images such as names, location where the digital picture was taken, season of the year, description of the digital picture setting and the like. It is well known to those skilled in the art how to perform Image analysis, create metadata and create descriptive tags. All three types of tagging may be included or just one or two of the types of tagging may be performed according to the exemplary embodiments. However, it is preferred that all three types of tagging be done. Image analysis, creating metadata and creating descriptive tags collectively may be referred to hereafter as "tagging" or "tagged".

Figure 3:
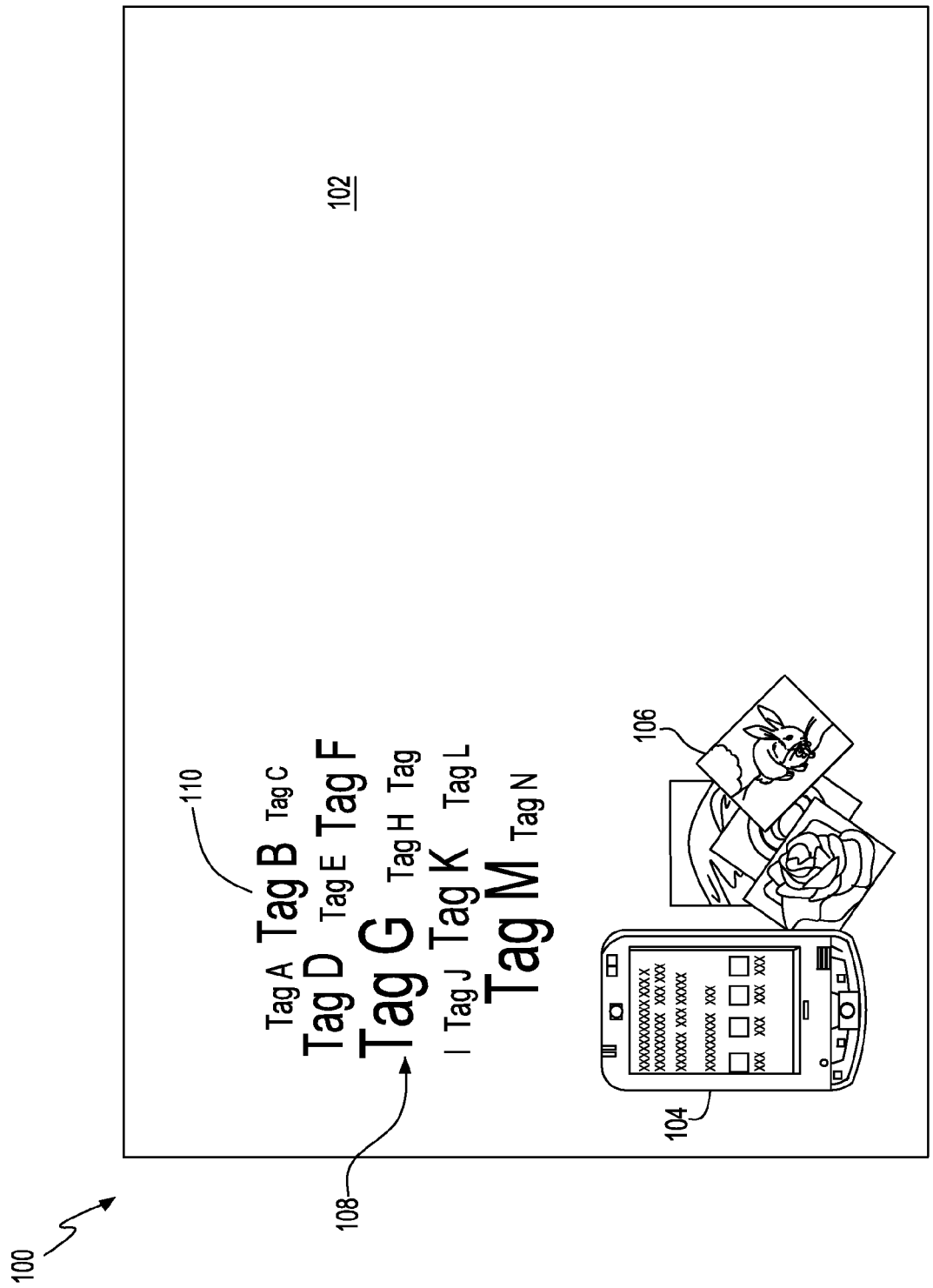
FIG. 3 is a plan view of the surface computer of FIG. 1 with a tag cloud being displayed along with the transferred digital images.

Thereafter, as indicated in block 212 of method 200, the attributes of the digital images may be identified and quantified. By quantified, it is meant that the prevalence of the attributes (i.e., how often they appear) in the digital images is determined. From this information, a tag cloud is created, block 214. A tag cloud is a visual presentation of the tags in all of the digital images with font size of the tag indicating, for example, the prevalence of the tag. It is noted that a tag cloud may also be referred to as a cloud tag. The tag cloud 108 may be displayed on the touch screen 102 of the surface computer 100 as shown in FIG. 3. It is noted that the individual tags 110 within the tag cloud 108 have different font size indicating their prevalence in the digital images 106. For example, tags G and M appear most often in the digital images 106 while tags A, C and J appear least often in the digital images 106.

For a sampling of ten digital images, the prevalence of the individual tags may appear as follows:

TABLE 1

| DIGITAL IMAGE | TAGS |
| --- | --- |
| Image 1 | Tag B, Tag G, Tag H |
| Image 2 | Tag B, Tag K, Tag G |
| Image 3 | Tag G, Tag K, Tag L |
| Image 4 | Tag G, Tag L, Tag D |
| Image 5 | Tag G, Tag K, Tag F |
| ... | ... |
| ... | ... |
| Image 10 | Tag F, Tag G, Tag H |

Each tag represents a set of attributes which have been previously determined (blocks 206, 208, 210 in FIG. 2) in the digital images. It is noted in Table 1 that tag G is common to all of the digital images. It is further noted that the tags may be arranged in the following order according to their increasing prevalence in Table 1: tag D, tag L, tag B, tag F, tag H, tag K and tag G.

According to the exemplary embodiments, it is desirable to display the tags in a meaningful way. Thus, a primary tag may be selected, block 216 in FIG. 2. For the sampling of digital images in Table 1, the primary tag may be tag G because it is common to all of the digital images in Table 1. The related tags are then determined, block 218 in FIG. 2, which are all of the other tags in the digital images in which tag G is the primary tag. In the case of Table 1, the related tags would be tag D, tag L, tag B, tag F, tag H, tag K.

It should be understood that for other groups of digital images, there may be a different primary tag and different related tags. For example, in the above table, tag K may be the primary tag for images 2, 3, 5 and the related tags may be tag B, tag G, tag L and tag F.

Figure 4:
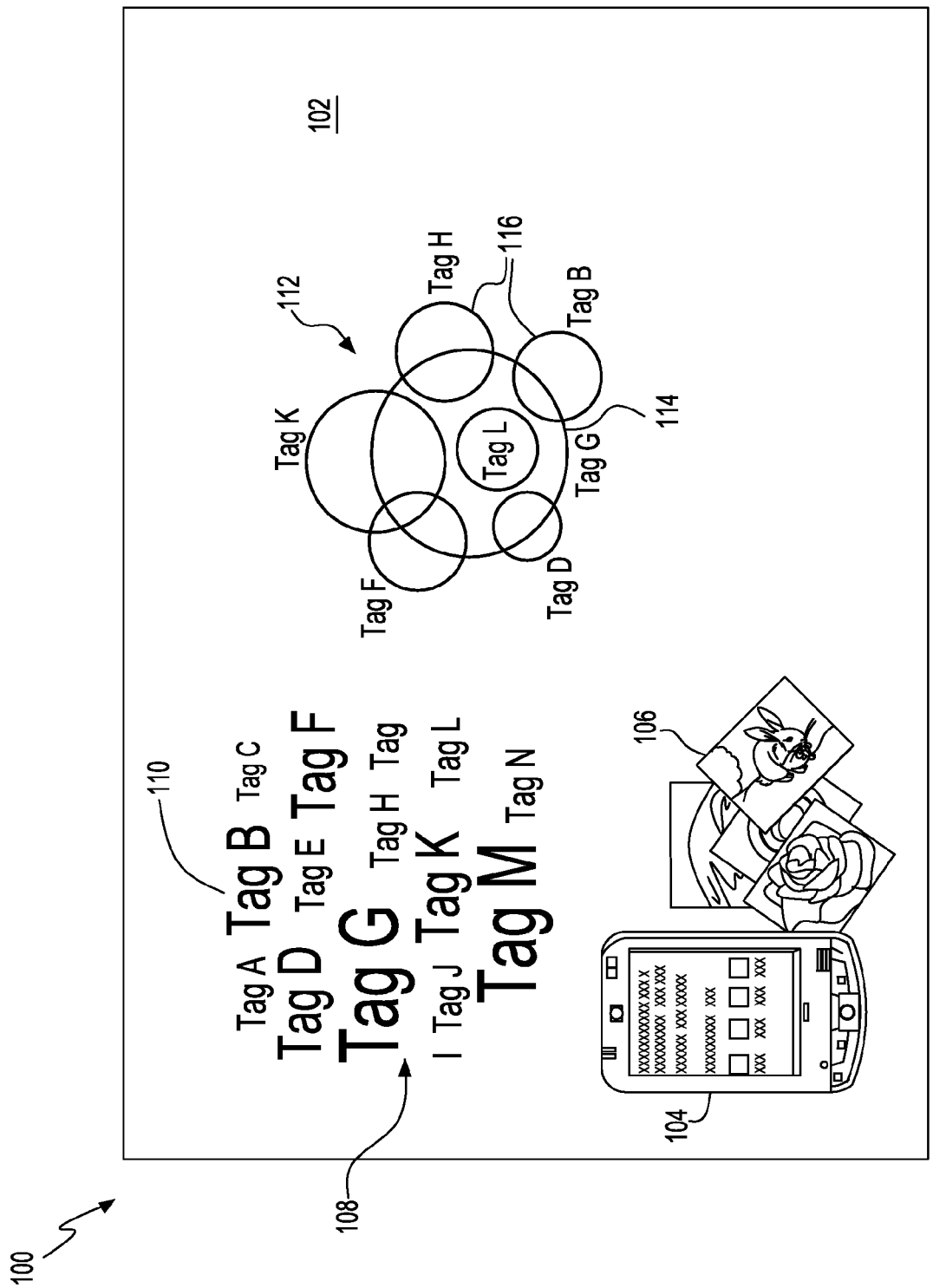
FIG. 4 is a plan view of the surface computer of FIG. 3 with a primary tag diagram displayed along with the tag cloud and transferred digital images.

Once the primary tag and related tags have been determined according to method 200, a primary tag diagram may be created, block 220 in FIG. 2. Referring to FIG. 4, a primary tag diagram 112 has been created with tag G being the primary tag and being represented by the center circle 114. The related tags—tag D, tag L, tag B, tag F, tag H, tag K—are displayed as other, usually smaller, circles 116. The primary tag diagram 112 is a convenient way of displaying a primary tag and related tags.

While the primary tag diagram has some similarities with a Venn diagram, the primary tag diagram is not a Venn diagram. A principle of Venn diagrams is that each set of attributes has a relationship with every other set of attributes. The primary tag diagram of the exemplary embodiments does not meet this Venn diagram principle since it is only the primary tag that has a relationship with every other related tag but the related tags do not necessarily have a relationship with every other related tag.

It should be understood that other geometric features may be used in the primary tag diagram 112 in place of circles. Such other geometric features may be other closed-plane features such as squares, rectangles, triangles, pentagons, etc.

Figure 5:
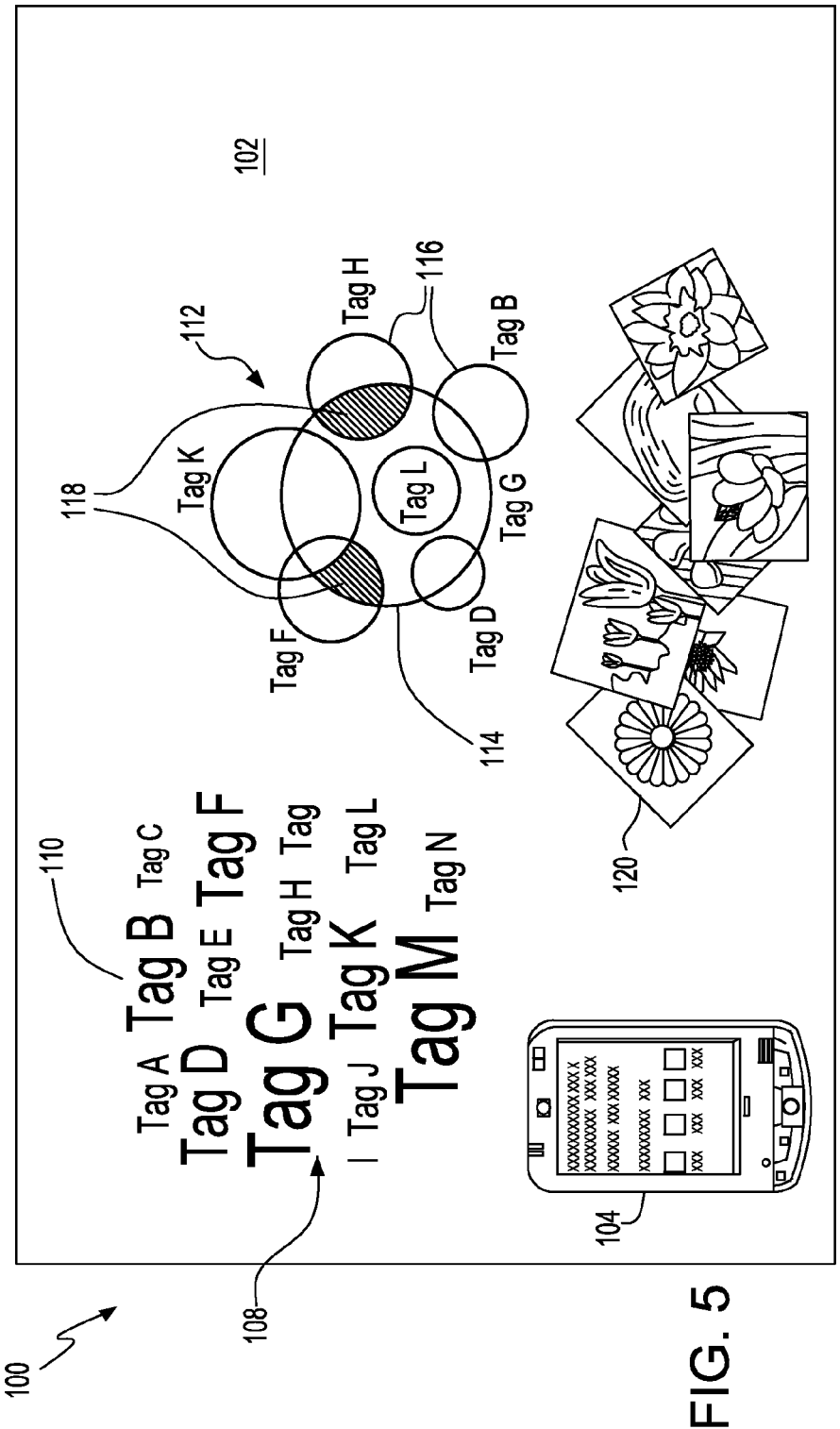
FIG. 5 is a plan view of the surface computer of FIG. 4 with selected digital images displayed along with the tag cloud and primary tag diagram.

Referring to FIGS. 2 and 5 simultaneously, at least one area 118 of the primary tag diagram 112 is selected, block 222. It can be seen that in the present example, there are two such areas 118 selected which represent the intersection of the circles representing tags G and F and tags G and H.

The digital images 120 represented by selected areas 118 may then be displayed, block 224, as shown in FIG. 5. Once the digital images 120 are displayed, it is no longer desirable to display the original digital images 106 which may then be hidden.

It can be seen that of all of the possible digital images in the mobile device 104 represented by the tag cloud 108, a subset of those digital images may be selected that have the tag G in common and this selection may be narrowed down further by only selecting digital images that have certain related tags in common with the primary tag.

If the selected images 120 are not satisfactory or are too many, the method 200 may begin again by creating a new tag cloud, block 214, and continuing with the remaining steps of the method 200.

Figure 6:
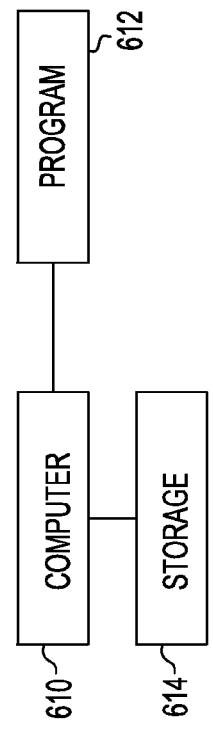
FIG. 6 is a block diagram that illustrates one exemplary hardware environment of the exemplary embodiments.

The program environment in which the exemplary embodiments may be executed illustratively incorporates a general-purpose computer. FIG. 6 is a block diagram that illustrates one exemplary hardware environment of the present invention. The exemplary embodiments may be implemented using a surface computer 610 including a computer processor, random access memory (RAM), read-only memory (ROM) and other components. Resident in the computer 610, or peripheral to it, will be a storage device 614 of some type such as a hard disk drive, floppy disk drive, CD-ROM drive, tape drive or other storage device.

Generally speaking, the software implementation of the exemplary embodiments, program 612 in FIG. 6, is tangibly embodied in a computer-readable medium such as one of the storage devices 614 mentioned above. The program 612 includes instructions which, when read and executed by the computer 610 causes the computer 610 to perform the steps necessary to execute the steps or elements of the exemplary embodiments.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of image selection in a surface computing device comprising:
    responsive to placing a device containing a plurality of digital images in proximity to the surface computing device, transferring the plurality of images to the surface computing device;
    creating tags from attributes of the plurality of images and grouping the tags together to form a word tag cloud without geometric shapes such that each tag has a font size indicative of the prevalence of the tag in the tag cloud;
    displaying on the surface computing device the word tag cloud;
    selecting one tag as a primary tag such that the primary tag has attributes common to a subset of the plurality of images;
    responsive to the selecting the primary tag, identifying tags related to the primary tag such that the tags related to the primary tag ("related tag") are the tags having attributes of the subset of the plurality of images that are not common to all of the subset of the plurality of images;
    displaying on the surface computing device the primary tag and related tags as a series of geometric shapes in a primary tag diagram with each of the primary tag and related tags being represented by a geometric shape such that a first geometric shape representing one of the related tags overlaps the geometric shape representing the primary tag to form a first area of intersection representing at least one image and a second geometric shape representing another one of the related tags only overlaps the geometric shape representing the primary tag to form a second area of intersection representing at least one image wherein the first geometric shape and second geometric shape do not overlap; and
    responsive to selecting at least one of the first area of intersection and the second area of intersection, displaying on the surface computing device the at least one image corresponding to the selected at least one of the first area of intersection and the second area of intersection;
    wherein the entire word tag cloud representing all of the plurality of images, primary tag diagram representing a subset of the plurality of images and at least one image are separately and simultaneously displayed on the surface computing device.

2. The method of claim 1 wherein a plurality of geometric shapes representing a plurality of the related tags overlap the geometric shape representing the primary tag.

3. The method of claim 1 wherein a size of the primary tag and a size of each of the related tags in the primary tag diagram are in proportion to the prevalence of the primary tag and related tags in the digital images.

4. The method of claim 1 wherein the geometric shape representing the primary tag is larger than any other geometric shape.

5. The method of claim 1 wherein a plurality of geometric shapes representing a plurality of the related tags are positioned around the geometric shape representing the primary tag.

6. The method of claim 1 wherein attributes of the digital images are determined by at least one of performing an image analysis of the digital images, creating metadata of the digital images and creating descriptive tags of the digital images.

7. A method of image selection in a surface computing device having a plurality of digital images comprising:
    creating tags from attributes of the plurality of images and grouping the tags together to form a word tag cloud without geometric shapes such that each tag has a font size indicative of the prevalence of the tag in the tag cloud;
    displaying the word tag cloud;
    selecting one tag as a primary tag such that the primary tag has attributes common to a subset of the plurality of images;
    responsive to the selecting the primary tag, identifying tags related to the primary tag such that the tags related to the primary tag ("related tag") are the tags having attributes of the subset of the plurality of images that are not common to all of the subset of the plurality of images;
    displaying the primary tag and related tags as a series of geometric shapes in a primary tag diagram with each of the primary tag and related tags being represented by a geometric shape such that a first geometric shape representing one of the related tags overlaps the geometric shape representing the primary tag to form a first area of intersection representing at least one image and a second geometric shape representing another one of the related tags only overlaps the geometric shape representing the primary tag to form a second area of intersection representing at least one image wherein the first geometric shape and second geometric shape do not overlap; and
    responsive to selecting at least one of the first area of intersection and the second area of intersection, displaying the at least one image corresponding to the selected at least one of the first area of intersection and the second area of intersection;
    wherein the entire word tag cloud representing all of the plurality of images, primary tag diagram representing a subset of the plurality of images and at least one image are separately and simultaneously displayed;

wherein the processes of creating, displaying the word tag cloud, selecting, identifying, displaying the primary tag and related tags and displaying the at least one image are performed by a computer processor.

8. The method of claim 7 wherein a plurality of geometric shapes representing a plurality of the related tags overlap the geometric shape representing the primary tag.

9. The method of claim 7 wherein a size of the primary tag and a size of each of the related tags in the primary tag diagram are in proportion to the prevalence of the primary tag and related tags in the digital images.

10. The method of claim 7 wherein the geometric shape representing the primary tag is larger than any other geometric shape.

11. The method of claim 7 wherein a plurality of geometric shapes representing a plurality of the related tags are positioned around the geometric shape representing the primary tag.

12. The method of claim 7 wherein attributes of the digital images are determined by at least one of performing an image analysis of the digital images, creating metadata of the digital images and creating descriptive tags of the digital images.

13. A computer program product for image selection in a surface computing device, the computer program product comprising:
   a tangible non-transitory computer readable storage medium having a computer readable program code embodied therewith, the computer readable program code comprising:
   responsive to placing a device containing a plurality of digital images in proximity to the surface computing device, computer readable program code configured to transfer the plurality of images to the surface computing device;
   computer readable program code configured to create tags from attributes of the plurality of images and grouping the tags together to form a word tag cloud without geometric shapes such that each tag has a font size indicative of the prevalence of the tag in the tag cloud;
   computer readable program code configured to display on the surface computing device the tag cloud;
   computer readable program code configured to select one tag as a primary tag such that the primary tag has attributes common to a subset of the plurality of images;
   responsive to the computer readable program code configured to select the primary tag, computer readable program code configured to identify tags related to the primary tag such that the tags related to the primary tag ("related tag") are the tags having attributes of the subset of the plurality of images that are not common to all of the subset of the plurality of images;
   computer readable program code configured to display on the surface computing device the primary tag and related tags as a series of geometric shapes in a primary tag diagram with each of the primary tag and related tags being represented by a geometric shape such that a first geometric shape representing one of the related tags overlaps the geometric shape representing the primary tag to form a first area of intersection representing at least one image and a second geometric shape representing another one of the related tags only overlaps the geometric shape representing the primary tag to form a second area of intersection representing at least one image wherein the first geometric shape and second geometric shape do not overlap; and
   responsive to selecting at least one of the first area of intersection and the second area of intersection, computer readable program code configured to display on the surface computing device the at least one image corresponding to the selected at least one of the first area of intersection and the second area of intersection;
   wherein the entire word tag cloud representing all of the plurality of images, primary tag diagram representing a subset of the plurality of images and at least one image are separately and simultaneously displayed on the surface computing device.

14. The computer program product of claim 13 wherein attributes of the digital images are determined by at least one of computer readable program code configured to perform an images analysis of the digital images, computer readable program code configured to create metadata of the digital images and computer readable program code configured to create descriptive tags of the digital images.

* * * * *